United States Patent
Schramm et al.

(10) Patent No.: US 6,756,890 B1
(45) Date of Patent: Jun. 29, 2004

(54) METHOD AND APPARATUS FOR STABILIZING A VEHICLE IN THE PRESENCE OF A TILT TENDENCY

(75) Inventors: Herbert Schramm, Leonberg (DE); Peter Dominke, Bietigheim-Bissingen (DE); Klaus-Dieter Leimbach, Moeglingen (DE); Gabriel Wetzel, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/554,982
(22) PCT Filed: Jul. 30, 1998
(86) PCT No.: PCT/DE98/02184

§ 371 (c)(1),
(2), (4) Date: Sep. 21, 2000

(87) PCT Pub. No.: WO99/26823
PCT Pub. Date: Jun. 3, 1999

(30) Foreign Application Priority Data

Nov. 22, 1997 (DE) .......................................... 197 51 891

(51) Int. Cl.⁷ ................................................. B60Q 1/00
(52) U.S. Cl. ............................... 340/440; 701/1; 701/72
(58) Field of Search ................................. 340/440, 429, 340/436, 437; 701/70, 72, 1; 186/65.3, 197; 192/107 C

(56) References Cited

U.S. PATENT DOCUMENTS

| | | | | |
|---|---|---|---|---|
| 3,609,313 A | | 9/1971 | Lucien ........................ 701/70 |
| 4,386,674 A | | 6/1983 | Sugata ........................ 180/422 |
| 4,856,610 A | * | 8/1989 | Leiber et al. ................ 180/197 |
| 4,964,679 A | | 10/1990 | Rath ........................... 303/146 |
| 6,112,146 A | * | 8/2000 | Mueller ........................ 701/71 |
| 6,202,016 B1 | * | 3/2001 | Stephenson et al. ........... 701/34 |
| 6,223,107 B1 | * | 4/2001 | Mergenthaler et al. ........ 701/34 |
| 6,272,420 B1 | * | 8/2001 | Schramm et al. ............. 701/72 |
| 6,311,111 B1 | * | 10/2001 | Leimbach et al. ............ 701/38 |
| 6,321,141 B1 | * | 11/2001 | Leimbach ...................... 701/1 |
| 6,324,447 B1 | * | 11/2001 | Schramm et al. .............. 701/1 |
| 6,370,938 B1 | * | 4/2002 | Leimbach et al. ........... 73/1.81 |

FOREIGN PATENT DOCUMENTS

| | | |
|---|---|---|
| DE | 32 22 149 | 11/1983 |
| DE | 43 42 732 | 6/1995 |
| DE | 196 32 943 | 2/1998 |
| JP | 01 101238 | 4/1989 |
| WO | 97 28017 | 8/1997 |

OTHER PUBLICATIONS

Zantan, Van A. et al., "FDR–Die Fahrdynamik–13 Regelung Von Bosch" ATZ Automobiletechnische Zeitschrift, vol. 96, No. 11, Nov. 1, 1994, p. 674–678, 683–689*.

Leiber, Limpert, "Der Elektronische Bremsregler," ATZ Automobiltechnische Zeitschrift, vol. 71, No. 6, Jun. 1969, p. 181–189*.

Kraftfahrtechnisches Taschenbuch, VDI Verlag, 21st edition, p. 346**.

* cited by examiner

Primary Examiner—Daryl Pope
(74) Attorney, Agent, or Firm—Kenyon & Kenyon

(57) ABSTRACT

A method and apparatus for stabilizing a vehicle in the presence of a tilt tendency are described. For this purpose, for at least one wheel, a variable quantitatively describing a wheel behavior of at least one wheel is determined. At least as a function of the variable that quantitatively describes the wheel behavior determined for the at least one wheel, a determination is made as to whether a tendency to tilt about a vehicle axis oriented in the longitudinal direction of the vehicle exists.

14 Claims, 7 Drawing Sheets

METHOD AND APPARATUS FOR STABILIZING A VEHICLE IN THE PRESENCE OF A TILT TENDENCY

FIELD OF THE INVENTION

The present invention relates to a method and an apparatus for stabilizing a vehicle in the presence of a tilt tendency.

BACKGROUND INFORMATION

Methods and apparatuses for stabilizing a vehicle in the presence of a tilt tendency of many variations are conventional.

German Patent 32 22 149 describes a method and a device for preventing lateral tilting of a vehicle. The vehicle in this case is a straddle loader. The apparatus contains a measurement device for calculating the height of the overall center of gravity of the vehicle with the load. It furthermore contains a device for calculating the static stability of the vehicle, as a critical reference value, from the quotient of the vehicle track and twice the height of the overall center of gravity. The apparatus also contains a device for calculating the dynamic instability from the quotient of the vehicle speed squared and the product of the curve radius (calculated from the respective control angle) times the acceleration of gravity. If the dynamic instability exceeds the reference value, the speed of the vehicle is reduced. This is done by activating the vehicle brakes and the corresponding actuation of the engine clutch.

PCT Application No. 97/28017 describes a vehicle dynamic control method and a corresponding apparatus for commercial vehicles that are equipped with an ABS system. With this method and apparatus, a decrease in the tilt stability of the vehicle while traveling through a curve is determined on the basis of the utilization of an ABS control intervention. For this purpose, a determination is made as to whether the transverse acceleration of the vehicle exceeds a limit value defined for it. If the transverse acceleration exceeds this limit value, a braking intervention, which is smaller relative to the maximum possible braking force, is initiated. Monitoring then takes place, by measuring the power supply at the plug connector of the tractor or at the ABS valve, to determine whether the ABS system responds. If a response is detected, an alarm signal is triggered and/or a control intervention that increases tilt stability, for example a braking event, is performed.

German Patent No. 196 32 943 describes a method for operating a motor vehicle having a braking system with which wheels on the same axle can be braked independently of one another. With the method, vehicle-stabilizing braking interventions are performed automatically by way of the braking system. At least one instantaneous value for a vehicle-dynamics parameter indicative of the vehicle tilt tendency about the longitudinal vehicle axis is continuously compared to an associated tilt-prevention threshold value. As soon as one of the instantaneous values exceeds the associated threshold value, the wheels on the outside of the curve are braked for tilt-prevention purposes.

German Patent No. 43 42 732 describes equipping a tanker vehicle with sensors to monitor the tilt susceptibility of the tanker vehicle. The sensors provided detect wheel loads. The sensors are connected to an analysis circuit. If a potential tilting hazard is detected, then the road speed of the tanker vehicle is reduced by way of the drive system and/or braking system.

The analysis of a variable describing the change in slip and/or a variable describing the diameter or the radius of a wheel is not described by any of the above-referenced patents. In addition, the performance of a controlled braking intervention on the front wheel on the outside of the curve is not described in any of these documents.

SUMMARY OF THE INVENTION

An object of the present invention is to provide a method for stabilizing a vehicle in the presence of a tilt tendency with which a tipover of the vehicle is prevented; which, in order to determine the tilt tendency, uses variables in alternative to the wheel loads; and which, when a tilt tendency exists, makes possible an alternative intervention on the braking system in order to stabilize the vehicle.

The method stabilizes a vehicle in the presence of a tilt tendency. For this purpose, for at least one wheel, a variable quantitatively describing the wheel behavior of the corresponding wheel is determined. A determination is also made, at least as a function of the variable quantitatively describing the wheel behavior that was determined for the at least one wheel, as to whether a tendency to tilt about a vehicle axis oriented in the longitudinal direction of the vehicle exists for the vehicle. If a tilt tendency exists, then at least stabilizing braking interventions on at least one wheel of the vehicle are preformed.

According to the present invention, for at least one wheel, a variable describing the slip and/or a variable describing the diameter or the radius of the respective wheel are determined as the variable that quantitatively describes the wheel behavior. As a function of a variable that describes the change in the slip of the respective wheel or the variable describing the diameter or the radius of the respective wheel, a determination is made as to whether a tilt tendency about a vehicle axis oriented in the longitudinal direction of the vehicle exists for the vehicle. With this method, a tipover of the vehicle is prevented.

The use of the two aforementioned variables has the following advantage: These variables are each directly correlated with the tire behavior. Since a tipover of the vehicle initially becomes apparent in the tire behavior, evaluating these variables in terms of the time at which a tipover tendency is detected yields an advantage in terms of time.

Note that when the term "tilt tendency of the vehicle" is used hereinafter, it means the "tilt tendency of the vehicle about a vehicle axis oriented in the longitudinal direction of the vehicle." The term "a vehicle axis oriented in the longitudinal direction of the vehicle" is to be understood as follows: In the case of the vehicle axis about which a tilt tendency of the vehicle occurs, it can be the actual longitudinal vehicle axis. It may also be a vehicle axis that is rotated through a certain angle with respect to the actual longitudinal vehicle axis. It is immaterial in this context whether the rotated vehicle axis passes through the center of gravity of the vehicle. The instance of the rotated vehicle axis is also intended to allow for an orientation of the vehicle axis in which the vehicle axis corresponds either to a diagonal axis of the vehicle or an axis parallel thereto.

Advantageously, a variable dependent on the wheel load acting on the respective wheel is determined for the at least one wheel as the variable quantitatively describing the wheel behavior of the respective wheel.

It is advantageous to determine for the at least one wheel, as the variable quantitatively describing the behavior of the respective wheel, a variable that describes the diameter or the radius of the respective wheel. This variable is determined at least as a function of a variable describing the wheel rotation speed of the corresponding wheel, a variable describing the vehicle speed, a variable representing the transverse dynamics of the vehicle, and a variable describing the geometry of the vehicle. For this, what is advantageously determined as the variable representing the transverse dynamics of the vehicle is a variable describing the yaw rate of the vehicle and/or a variable describing the transverse acceleration of the vehicle; and the variable describing the vehicle speed is determined at least as a function of variables, determined for the wheels, which describe the wheel rotation speeds.

The following procedure is advantageously useful for detecting the tilt tendency of a vehicle: For at least one wheel, a variable describing the wheel rotation speed is determined. In addition, at least one variable representing the transverse dynamics of the vehicle is determined. At least as a function of one of the variables representing the transverse dynamics of the vehicle, braking torques and/or drive torques are briefly generated and/or modified at at least one wheel. While the braking torques and/or drive torques are being briefly generated and/or modified at the at least one wheel, and/or after the braking torques and/or drive torques have been briefly generated and/or modified at the at least one wheel, the variable quantitatively describing the wheel behavior is determined for that at least one wheel, at least as a function of the variable describing the wheel rotation speed of that wheel. To detect the tilt tendency of the vehicle, during the time period in which the braking torques and/or drive torques are being briefly generated and/or modified at the at least one wheel, and/or after the braking torques and/or drive torques have been briefly generated and/or modified at the at least one wheel, the resulting change in the variable quantitatively describing the wheel behavior is determined. A tilt tendency of the vehicle about a vehicle axis oriented in the longitudinal direction of the vehicle exists if the magnitude of the resulting change in the variable quantitatively describing the wheel behavior is greater than a corresponding threshold value.

In this case, what is used as the variable quantitatively describing the wheel behavior is the variable that describes the slip. In other words, during the time period in which the braking torques and/or drive torques are being briefly generated and/or modified at the at least one wheel, and/or after the braking torques and/or drive torques have been briefly generated and/or modified at the at least one wheel, the variable that describes the change in the slip of the respective wheel is determined. Consequently, a tilt tendency of the vehicle exists if the magnitude of the variable that describes the change in the slip of the respective wheel is greater than a corresponding threshold.

Advantageously, a determination is made, at least as a function of one of the determined variables representing the transverse dynamics of the vehicle, as to which wheels of the vehicle are suitable for detecting a tilt tendency of the vehicle about a vehicle axis oriented in the longitudinal direction of the vehicle. Detection of the tilt tendency of the vehicle is advantageously accomplished on the basis of at least one of these wheels, by briefly generating and/or modifying braking torques and/or drive torques at at least one of those wheels. In particular, the wheels of the vehicle located on the inside of the curve are selected in this context.

According to a second recognition system, a tilt tendency for the vehicle exists if, for at least one wheel, the value of the variable quantitatively describing the wheel behavior is greater than a first threshold value; or if, for at least one wheel, the value of the variable quantitatively describing the wheel behavior is less than a second threshold value; and/or if, for at least one wheel, the magnitude of a difference that is constituted from the value of the variable quantitatively describing the wheel behavior and from a comparison value is greater than a corresponding threshold value; and/or if, for at least one wheel, the magnitude of a variable that describes the change over time in the variable quantitatively describing the wheel behavior is less than a corresponding threshold value; and/or if the magnitude of a variable describing the angle of inclination of a wheel axle is greater than a corresponding threshold value, the variables quantitatively describing the wheel behavior being determined for each of the wheels of the corresponding wheel axle, and the variable describing the angle of inclination of the wheel axle being determined as a function of those variables. Or a tilt tendency for the vehicle exists if the magnitude of a difference that is constituted from a variable describing the vehicle speed and from a speed limit value is less than a corresponding threshold value.

In this case, the variable that describes the diameter or the radius of a wheel is used as the variable quantitatively describing the wheel behavior.

It is particularly advantageous if stabilizing braking interventions are performed, at least on the front wheel of the vehicle on the outside of the curve, in such a way that a braking torque is generated and/or increased at that wheel. Advantageously, engine interventions and/or interventions on suspension actuators are also performed in order to stabilize the vehicle.

The apparatus according to the present invention for stabilizing a vehicle in the presence of a tilt tendency, with which a tipover of the vehicle is prevented, contains means with which, in the presence of a tilt tendency, at least stabilizing braking interventions are performed on at least one wheel of the vehicle. The apparatus further contains means with which, for at least one wheel, a variable that describes the change in the slip of the respective wheel is determined and with which, as a function of that variable, a determination is made as to whether a tilt tendency about a vehicle axis oriented in the longitudinal direction of the vehicle exists for the vehicle. Alternatively or additionally, the apparatus contains means with which a variable describing the diameter or the radius of the respective wheel is determined, and further means with which, as a function of the variable describing the diameter or the radius of the respective wheel, determines whether a tilt tendency about a vehicle axis oriented in the longitudinal direction of the vehicle exists for the vehicle.

A further advantage is the following: The result of the method according to the present invention is to stabilize a vehicle in the presence of a tilt tendency, i.e. the method prevents a tipover of the vehicle. For this purpose, a determination is made as to whether a tilt tendency about a vehicle axis oriented in the longitudinal direction of the vehicle exists for the vehicle. If a tilt tendency exists, a stabilizing braking intervention is performed in controlled fashion on the front wheel of the vehicle on the outside of the curve.

Performing the controlled braking intervention on the front wheel on the outside of the curve has the following advantage: The conventional methods only propose braking interventions such that a reduction in the vehicle speed is achieved. Since none of the wheels is braked in controlled fashion, with this type of braking intervention it is not possible to apply a controlled yaw torque to the vehicle. Since a vehicle behaves in a strong oversteering fashion before tipping over, by way of a controlled braking intervention and the application of a yaw torque, it is possible to achieve a stabilization of the vehicle that, for example, counteracts the oversteering of the vehicle.

DETAILED DESCRIPTION

Figure 1A:
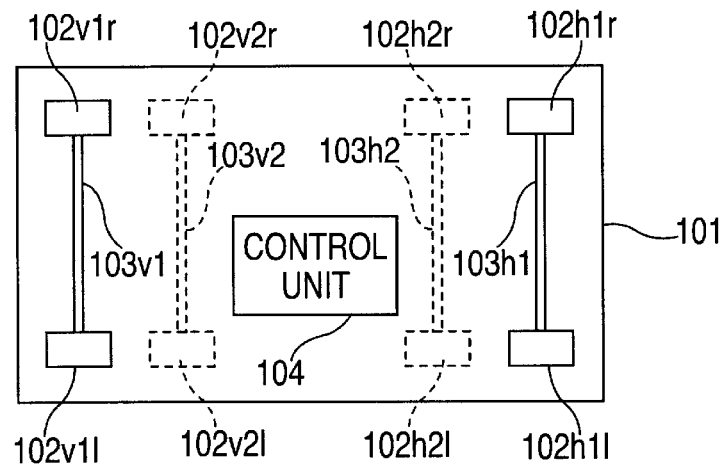
FIG. 1a shows a first road vehicle in which a method according to the present invention is implemented.
Figure 1B:
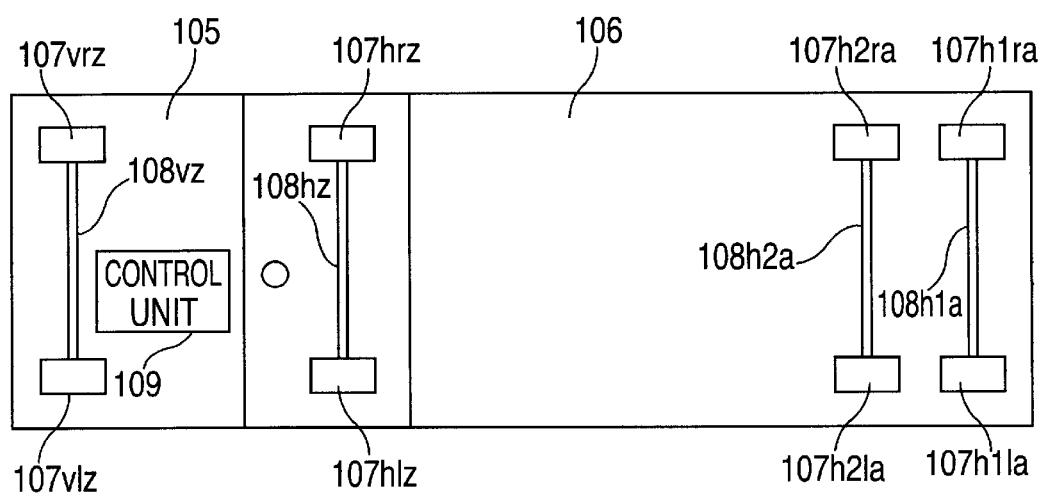
FIG. 1b shows a second road vehicle in which a method according to the present invention is implemented.

FIGS. 1a and 1b will be discussed first; these depict various road vehicles in which the method according to the present invention can be used.

FIG. 1 depicts an integral vehicle 101. This vehicle can be both a passenger car and a commercial vehicle. The integral vehicle 101 depicted in FIG. 1a is assumed to be a vehicle having at least two wheel axles, as indicated by the partially dashed-line depiction. The wheel axles of vehicle 101 are labeled 103$ix$. In this context, the index i indicates whether a front axle (v) or rear axle (h) is involved, and the index x indicates, in the case of vehicles having more than two axles, which of the front or rear axles is being referred to. The allocation is as follows: in each case the front axle or rear axle which is closest to the outer edge of the vehicle has allocated to it the index x having the smallest value. The farther away the particular wheel axle is from the outer edge of the vehicle, the greater the value of the associated index x. Wheels 102$ixj$ are assigned to wheel axles 103$ix$. The meanings of indices i and x correspond to what has already been described, while the index j indicates whether the wheel is located on the right (r) or left (l) side of the vehicle. In depicting wheels 102$ixj$, no distinction was made between single wheels and dual wheels. Vehicle 101 also contains a control unit 104 in which the apparatus according to the present invention for carrying out the method according to the present invention is implemented.

FIG. 1b depicts a vehicle combination comprising a tractor 105 and a semitrailer 106. The depiction is not intended to represent any limitation; a vehicle combination comprising a tractor and a drawbar trailer is also possible. Tractor 105 is assumed to have wheel axles 108$iz$. The corresponding wheels 107$ijz$ are allocated to wheel axles 108$iz$. The meanings of indices i and j correspond to those already described conjunction with FIG. 1a. Index z indicates which wheel axles or wheels of the tractor are being referenced. Tractor 105 furthermore has a control unit 109 with which a tilt tendency of tractor 105 and/or a tilt tendency of semitrailer 106 and/or a tilt tendency of the entire vehicle combination about a vehicle axis oriented in the longitudinal direction is detected. Semitrailer 106 is assumed to contain two wheel axles 108$ixa$. Wheels 107$ixja$ are correspondingly assigned to the two wheel axles 108$ixa$. The meanings of indices i, x, and j correspond to those already presented in conjunction with FIG. 1a. Index a indicates which components of semitrailer 106 are being referenced. The number of wheel axles depicted in FIG. 1b for tractor 105 and for semitrailer 106 is not intended to represent any limitation. Control unit 109 can also be arranged in semitrailer 106 rather than in tractor 105. It is also possible to equip both tractor 105 and semitrailer 106 with a control unit.

The labeling selected in FIGS. 1a and 1b using indices a, i, j, x, and z is the same for all variables and components for which they are used.

The apparatus and the method according to the present invention concern the stabilization of a vehicle in the presence of a tendency to tilt about a vehicle axis oriented in the longitudinal direction of the vehicle. Two exemplary embodiments based on different ways of detecting the tilt tendency are described below.

The first exemplary embodiment will first be described with the aid of FIGS. 2 and 3.

The vehicle in question is, as depicted in FIG. 1a, an integral vehicle. This integral vehicle has at least two wheel axles 103$ix$. These two wheel axles are front axle 103$v$1 that has wheels 103$v$1$r$ and 102$v$1$l$, and rear axle 103$h$1 that has wheels 102$h$1$r$ and 102$h$1$l$. Wheel rotation speed sensors 201$v$1$r$, 201$v$1$l$, 201$h$1$r$, and 201$h$1$l$ belonging to these wheels are depicted in FIG. 2. As indicated in FIG. 2, further wheel rotation speed sensors 201$ixj$ can be taken into account depending on the number of wheel axles of the integral vehicle. Wheel rotation speed sensors 201$ixj$ determine the values nixj, which respectively describe the wheel rotation speed of the corresponding wheel 102$ixj$. Wheel rotation speed sensors 201$ixj$ are present in any case regardless of the nature of controller 209, and the variables nixj generated by them are conveyed in any case to blocks 205 and 209 regardless of the type of controller 209 implemented in the apparatus according to the present invention.

A variety of sensors are available depending on the nature of controller 209 implemented in the apparatus according to the present invention. If controller 209 is a brake slip controller that acts on the wheel brakes on the basis of the control function being executed in it, and/or if controller 209 is a drive slip controller that acts on the wheel brakes and/or the engine on the basis of the control function being executed in it, then wheel rotation speed sensors 201$ixj$ are, as already indicated above, present in any case. In this case, however, transverse acceleration sensor 202, yaw rate sensor 203, and also steering angle sensor 204 are not present. In these cases, therefore, if the transverse acceleration and/or the yaw rate of the vehicle, and/or the steering angle, are required, these variables must be derived in a conventional manner in controller 209 or block 206 from the wheel rotation speeds nixj. In this case the deliveries of variables aq, delta, and omega drawn in for block 206 in FIG. 2 are to be replaced by a delivery of variables nixj. Any corresponding depiction omitted from FIG. 2, is not intended to constitute any limitation.

If, on the other hand, controller 209 is a controller whose basic function is to regulate a variable describing the vehicle dynamics of the vehicle, for example a variable dependent on the transverse acceleration and/or yaw rate of the vehicle, by acting on the wheel brakes and/or on the engine (one such controller is described, for example, in the publication. "FDR—die Fahrdynamikregelung von Bosch" (FDR—The Bosch Vehicle Dynamics Control System) that appeared in Automobiltechnische Zeitschrift (ATZ) 16, 1994, Vol. 11, pages 674 to 689), then, as indicated in FIG. 2, a transverse acceleration sensor 202, a yaw rate sensor 203, and a steering angle sensor 204 are also present in addition to wheel rotation speed sensors 201ixj. In this case the variables determined with the aid of the corresponding sensors can be processed in controller 209 or block 206. This situation is depicted in FIG. 2. In this situation, i.e. if the transverse acceleration sensor and/or the yaw rate sensor and/or the steering angle sensor should be absent, then the corresponding variable can also be derived from the wheel rotation speeds.

It is assumed hereinafter that vehicle 101 contains a transverse acceleration sensor 202, a yaw rate sensor 203, and a steering angle sensor 204. Variable aq describing the transverse acceleration of the vehicle, variable omega describing the yaw rate of the vehicle, and variable delta describing the steering angle of the vehicle are conveyed to blocks 206 and 209.

In block 205, a variable vf describing the vehicle speed is determined in a conventional manner from variables nixj. This variable vf is conveyed to block 209. Also determined in block 205 in a conventional manner, on the basis of variables nixj and variable vf, are variables lambdaixj, which describe the drive slip or brake slip on the wheels. These variables lambdaixj are conveyed both to block 206 and to block 209.

On the one hand, a determination is made in block 206 of the wheels of the vehicle that are threatening to lift off as a result of the vehicle state. In other words, a determination is made of the wheels of the vehicle that are suitable for detecting a tilt tendency of the vehicle about a vehicle axis oriented in the longitudinal direction of the vehicle.

Determination of these wheels is accomplished at least as a function of one of the determined variables (delta, aq, or omega) representing the transverse dynamics of the vehicle that are conveyed to block 206. For this purpose, a variable is determined in block 206, from variable delta describing the steering angle and/or variable aq describing the transverse acceleration of the vehicle and/or variable omega describing the yaw rate of the vehicle, on the basis of which it is possible to detect whether the vehicle is passing through a curve, and the nature of the curve (i.e. left-hand or right-hand curve).

In principle, it is sufficient to identify the wheels on the inside of the curve, since in a tilting event the wheels of the vehicle on the inside of the curve are usually the first to lift off, and because an incipient vehicle tilting event is "announced" by liftoff of the wheels on the inside of the curve. A refinement of the determination, such that a determination is made as to whether the front wheel or the rear wheel on the inside of the curve is more greatly threatened with lifting off, is possible. This is significant in the context that depending on the vehicle geometry and/or the vehicle loading, either the front wheel or the rear wheel on the inside of the curve is more greatly threatened with lifting off. As described above, what must be determined in this case is a variable that depends, for example, on the steering angle, the transverse acceleration of the vehicle, and the yaw rate of the vehicle. The variables determined for the wheels threatening to lift off (lambdaixja) are identified in FIG. 2 with the added index "a".

On the other hand, once the wheels threatening to lift off are known, signals SMixj are SM are generated in block 206, on the basis of which braking torques and/or drive torques are briefly generated and/or modified at at least one of the wheels threatening to lift off. Since the wheels threatening to lift off react sensitively to changes in wheel dynamics, it is possible to identify, for example by analyzing the slip values of the wheels threatening to lift off, whether a tilt tendency exists for the vehicle.

It is also possible, in determining the wheels of the vehicle that are threatening to lift off and that are thus suitable for detecting a tilt tendency of the vehicle, and/or in briefly generating and/or modifying the braking torques and/or drive torques at at least one wheel, additionally to take into account the drive concept of the vehicle, i.e. whether it is a vehicle with front-wheel, rear-wheel, or all-wheel drive. This can be achieved by correspondingly influencing variables SMixj or SM.

If individual braking interventions on the wheels of the vehicle are not possible, whether the braking system implemented does not permit it or it is not possible due to an existing vehicle state, then the determination of the wheels threatening to lift off is omitted in this case. In this case, braking torques and/or drive torques are briefly generated and/or modified at all the wheels of the vehicle simultaneously.

Variables SMixj and SM generated in block 206 are conveyed to block 209. Actuators 213ixj allocated to the wheels, with which braking torques can be generated, are activated on the basis of variables SMixj. A means allocated to engine 211, with which the torque delivered by the engine can be influenced, is activated on the basis of variable SM. Variables SMixj and SM are generated in block 206 in such a way that a braking torque and/or a drive torque is briefly generated and/or modified at the particular wheels threatening to lift off. In this context, a slight braking torque is built up by suitable activation of actuator 213ixj allocated to the particular wheel that is threatening to lift off, and/or there is a slight change in a braking torque already generated. In this context, a slight drive torque is generated by suitable activation of the means allocated to the vehicle engine and by way of actuators 213ixj allocated to the wheels, and/or there is a slight change in a drive torque already generated.

Slip values lambdaixja of the wheels threatening to lift off are conveyed from block 206 to a block 207. The two blocks 206 and 207 that are essential to the invention are combined into one block 208. As an alternative to the variable describing the slip of the respective wheel, it is also possible to use, as the variable quantitatively describing the wheel behavior, the variable that describes the wheel rotation speed and/or a variable describing the change over time in the wheel rotation speed.

In block 207, on the basis of variables lambdaixja conveyed to it, a determination is made as to whether there exists a tilt tendency of the vehicle about a vehicle axis oriented in the longitudinal direction of the vehicle. This is done by first determining, for at least one wheel that is threatening to lift off, the change deltalambdaixja in the corresponding variable quantitatively describing the wheel behavior. In this context, the change deltalambdaixja is determined during the period of time in which the braking torques and/or the drive torques are being briefly generated and/or modified at the respective wheel, and/or after the braking torques and/or drive torques have been briefly generated and/or modified at the respective wheel.

As a function of the change deltalambdaixja in the variable quantitatively describing the wheel behavior, a determination is made as to whether a tilt tendency exists for the vehicle. If the magnitude of variable deltalambdaixja is greater than a corresponding threshold value, then a tilt tendency of the vehicle exists. In this case a variable KT is generated in block 207 and is conveyed from block 207 to block 209. This variable KT informs controller or vehicle controller 209 as to whether a tilt tendency of the vehicle exists.

The number 209 designates the controller or vehicle controller implemented in control unit 104. Controller 209 is, for example, a controller whose basic function is to regulate a variable describing the vehicle dynamics of the vehicle, for example a variable dependent on the transverse acceleration and/or on the yaw rate of the vehicle, by interventions on the wheel brakes and/or on the engine. Reference is made at this juncture to the aforementioned publication "FDR—die Fahrdynamikregelung von Bosch." (FDR—The Bosch Vehicle Dynamics Control System) The control system, which performs its basic function in block 209 is based in a conventional fashion on variables nixj, delta, aq, omega, vf, and lambdaixj conveyed to block 209; a variable mot2 that describes, for example, the speed of engine 211 and that is conveyed from engine 211 to block 209; and variables ST2 that are conveyed to block 209 from a block 210, which represents the activation logic system for the actuators contained in the vehicle.

In addition to the control system, whose basic function is implemented in block 209, a tipover prevention function is implemented therein. In the context of the tipover prevention function, the controller performs two tasks. First, it converts variables SMixj and SM into corresponding signals ST1 that are conveyed to activation logic system 210, and on the basis of them, braking torques and/or drive torques are briefly generated and/or modified at the wheels threatening to lift off. Second, it performs the actual tipover prevention function on the basis of variables KT conveyed to it. This tipover prevention function can be at a higher level than the control system for the basic function.

Variables KT can inform controller 209 that a tilt tendency of the vehicle about a vehicle axis oriented in the longitudinal direction of the vehicle exists; in addition, controller 209 can be informed as to the severity of that tilt tendency, and of how and by way of which wheels the vehicle is threatening to tilt.

Controller 209 generates variables ST1 that are conveyed to activation logic system 210 with which the actuators allocated to the vehicle are activated. Variables ST1 inform activation logic system 210 of which actuators are to be activated and in what manner. Variables ST1 are determined, in this context, both for the basic function control system and for the detection of the tilt tendency and for the tipover prevention function. Regarding generation of the variables ST1 in accordance with the control system implemented for the basic function, reference is made to the aforementioned publication "FDR—die Fahrdynamikregelung von Bosch." (FDR—The Bosch Vehicle Dynamics Control System) Variables ST1 are correspondingly modified for the interventions that are performed for detecting the tilt tendency and for the tipover prevention function.

In order to prevent the vehicle from tipping over about a vehicle axis oriented in the longitudinal direction of the vehicle, the following interventions on the actuators of the vehicle are, for example, a decrease in the vehicle speed can be achieved by braking or by reducing the engine torque. Tipover of the vehicle can be counteracted in controlled fashion by individual-wheel braking interventions. For example, in the case of a vehicle that is severely oversteering prior to tipping over, and which as it tips over is rolling over the front wheel on the outside of the curve, a braking torque can be generated at that front wheel on the outside of the curve by way of a controlled braking intervention. As a result, the slip conditions at that wheel are modified in such a way that only small side forces can be transferred, and thus the tipover danger is reduced.

In addition, a rolling motion of the vehicle can be limited by interventions on the suspension actuators allocated to the vehicle.

In block 210, the activation logic system, variables ST1 generated by controller 209 are converted into activation signals for engine 211 and activation signals for the actuators of the vehicle. The actuators are, for example, suspension actuators 212ixj with which the behavior of the suspension can be influenced, and actuators 213ixj with which a braking force can be generated at the corresponding wheels. To activate engine 211, the activation logic system generates a signal mot1 with which, for example, the throttle valve position of the engine can be influenced. To activate suspension actuators 212ixj, activation logic system 210 generates signals Fsixj with which the damping or stiffness implemented by suspension actuators 212ixj can be influenced. To activate actuators 213ixj, which are configured as brakes, activation logic system 210 generates signals Aixj with which the brake forces generated by actuators 213ixj at the corresponding wheels can be influenced. Activation logic system 210 generates variables ST2, which are conveyed to controller 209 and contain a datum concerning activation of the individual actuators.

The suspension of the vehicle is influenced by suspension actuators 212ixj. To allow the controller to be aware of the current state of suspension actuators 212ixj, signals Frixj are conveyed from suspension actuators 212ixj to controller 209.

Figure 2:
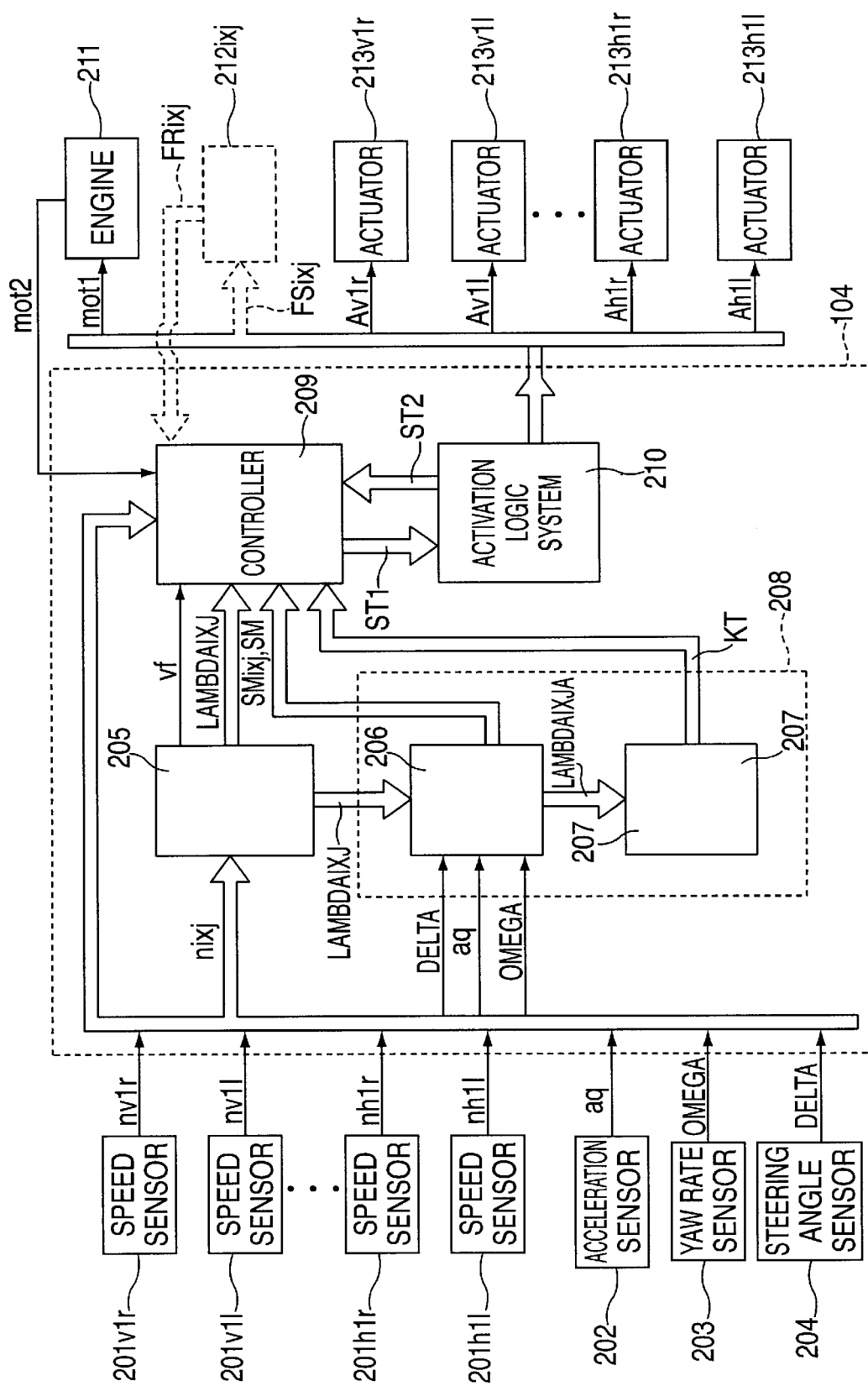
FIG. 2 shows a schematic arrangement of a first embodiment of an apparatus according to the present invention for carrying out a method according to the present invention.

In addition to the actuators depicted in FIG. 2, the use of retarders is also possible. The braking system used in FIG. 2 can be a hydraulic, pneumatic, electrohydraulic or electropneumatic braking system.

Figure 3:
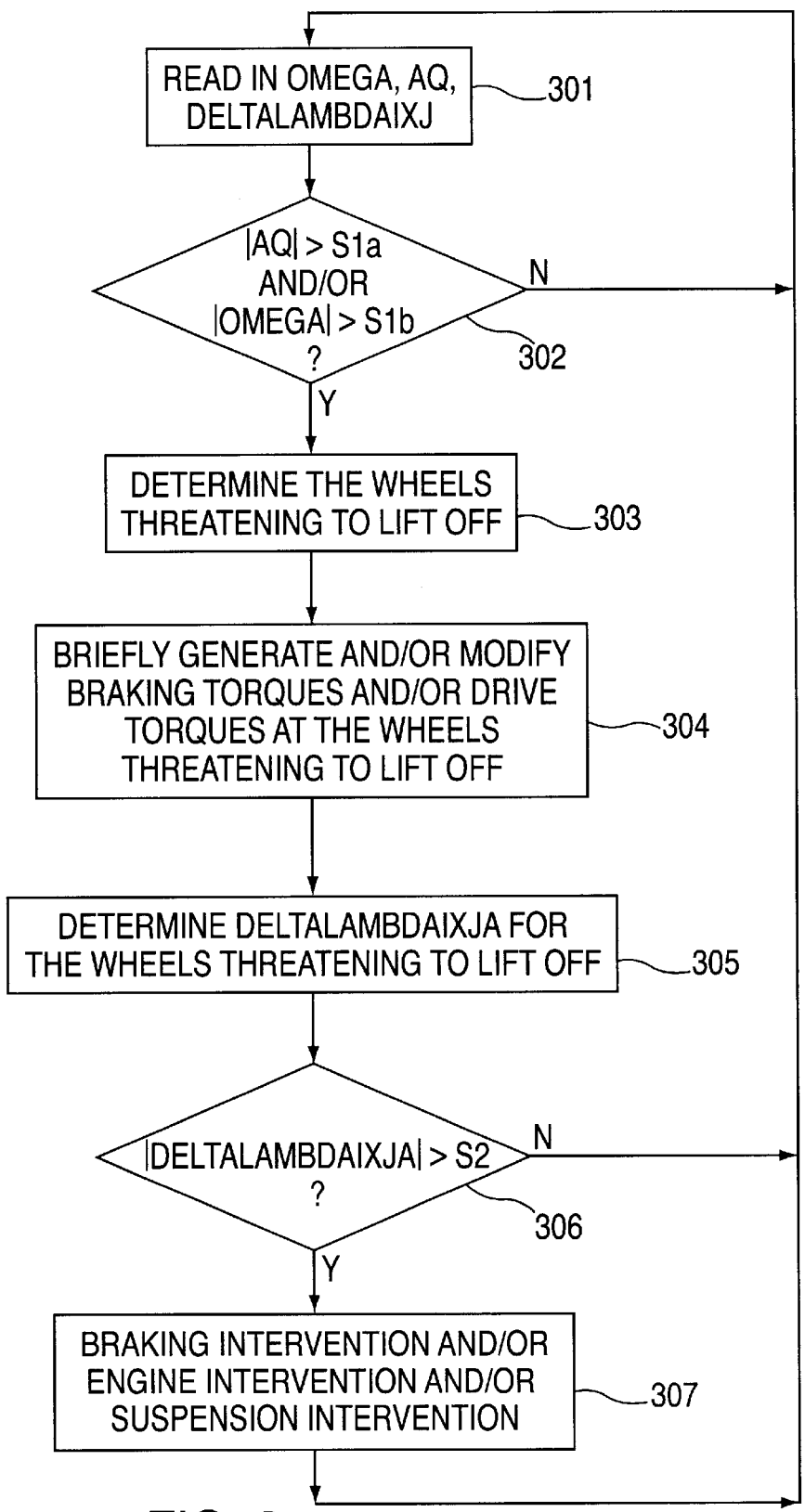
FIG. 3 shows a flow chart for carrying out a method according to the present invention.

FIG. 3 depicts a flow chart to describe the method according to the present invention executed in block 208. The fact that only an integral vehicle is discussed in FIG. 3 is not intended to create any limitation on the essential idea of the invention. The flow chart depicted in FIG. 3 is also correspondingly applicable to a vehicle combination.

The method according to the present invention begins with a step 301 in which variables omega, aq, delta, and lambdaixj are read in. Variables omega, aq, and delta have been either sensed with the aid of corresponding sensors or derived from the wheel rotation speeds. Subsequent to step 301, a step 302 is performed.

The query taking place in step 302 determines whether a vehicle state exists in which a tilt tendency of the vehicle about a vehicle axis oriented in the longitudinal direction of the vehicle can occur. For this purpose, a determination is made as to whether the magnitude of variable aq is greater than a first threshold value S1$a$, and/or whether the magnitude of variable omega is greater than a second threshold value S1$b$. If at least one of the two subquery conditions is met in step 302, then a step 303 is performed subsequent to step 302.

If, on the other hand, neither of the two subquery conditions is met in step 302, then step 301 is performed again subsequent to step 302.

In step 303, as already described above, the wheels of the vehicle that are threatening to lift off are identified, i.e. the wheels of the vehicle that are suitable for detecting a tilt tendency of the vehicle are identified.

Subsequent to step 303, a step 304 is performed. In this step 304, braking torques and/or drive torques are briefly generated and/or modified at at least one of the wheels threatening to lift off. For this purpose, variables SMixj and SM generated in block 206 are converted, in controller 209 and activation logic system 210, into corresponding activation signals. By suitable activation of actuator 213ixj allocated to the particular wheel threatening to lift off, a slight braking torque is built up and/or there is a slight modification in a braking torque already generated. By suitable activation of the means allocated to the engine of the vehicle, and by way of actuators 213ixj allocated to the wheels, a slight drive torque is generated and/or there is a slight modification in a drive torque already generated.

For the case in which individual interventions cannot be performed on the wheels of the vehicle, braking torques and/or drive torques are briefly generated and/or modified at all the wheels of the vehicle.

Figure 4:
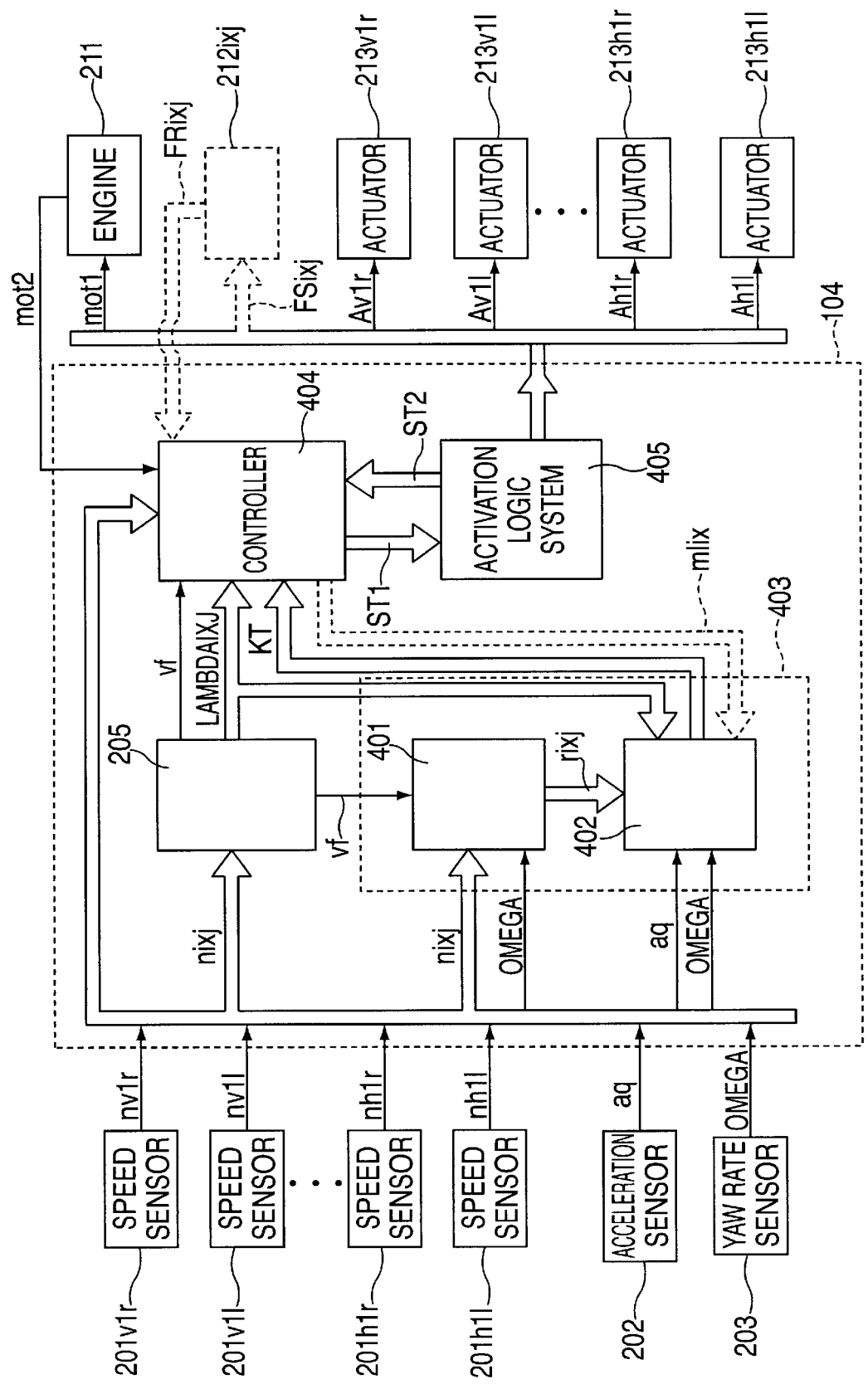
FIG. 4 shows a schematic arrangement of a second embodiment of an apparatus according to the present invention for carrying out a method according to the present invention.

Subsequent to step 304, a step 305 is performed. In this step 305, the change deltalambdaixja in the variable quantitatively describing the wheel behavior is determined for each of the wheels threatening to lift off. The variable describing the change deltalambdaixja is determined during the time period in which the braking torques and/or the drive torques are briefly generated and/or modified at the respective wheel, and/or after the braking torques and/or the drive torques have been briefly generated and/or modified at the respective wheel. Reference is made, at this junction, to FIG. 4 (yet to be described). Subsequent to step 305, a step 306 is performed.

In step 306 a determination is made, as a function of the variable deltalambdaixja, as to whether a tendency to tilt about a vehicle axis oriented in the longitudinal direction of the vehicle exists for the vehicle. A tilt tendency exists if the magnitude of variable deltalambdaixja is greater than a corresponding threshold value S2. In this case, a step 307 is performed subsequent to step 306. If, however, the magnitude of variable deltalambdaixja is less than threshold value S2, which is the same as saying that no tilt tendency exists, then step 301 is performed again subsequent to step 306.

In step 307, because of the fact that a tilt tendency of the vehicle about a vehicle axis oriented in the longitudinal direction of the vehicle exists, braking interventions and/or engine interventions and/or interventions on suspension actuators are performed that result in stabilization of the vehicle. The braking interventions, i.e. the interventions on actuators 213xij, and the engine interventions serve principally to reduce the vehicle speed. In addition, it is possible by way of braking interventions on individual wheels to generate stabilizing yaw torques in a conventional processor. Reference is made in this context to the above-described braking of the front wheel on the inside of a curve. As a result of the interventions on suspension actuators 212ixj, the rolling motion of the vehicle can be partly compensated for and the location of the center of gravity can be influenced.

Subsequent to step 307, step 301 is performed again.

The determination of the change in the variable quantitatively describing the wheel behavior is described once again. This determination can be accomplished in the following ways: Fist, it is possible to determine the resulting change during the time period in which the braking torques and/or drive torques are being briefly generated and/or modified. For example, by taking into account multiple values of the variable quantitatively describing the wheel behavior, the gradient of that variable lambdaixja may be determined. Second, the resulting change can be determined from the value that was present prior to the brief generation and/or modification of the braking torques and/or drive torques, and from the value correspondingly present afterward. For this purpose, the first value is temporarily stored in a storage medium.

Figure 5A:
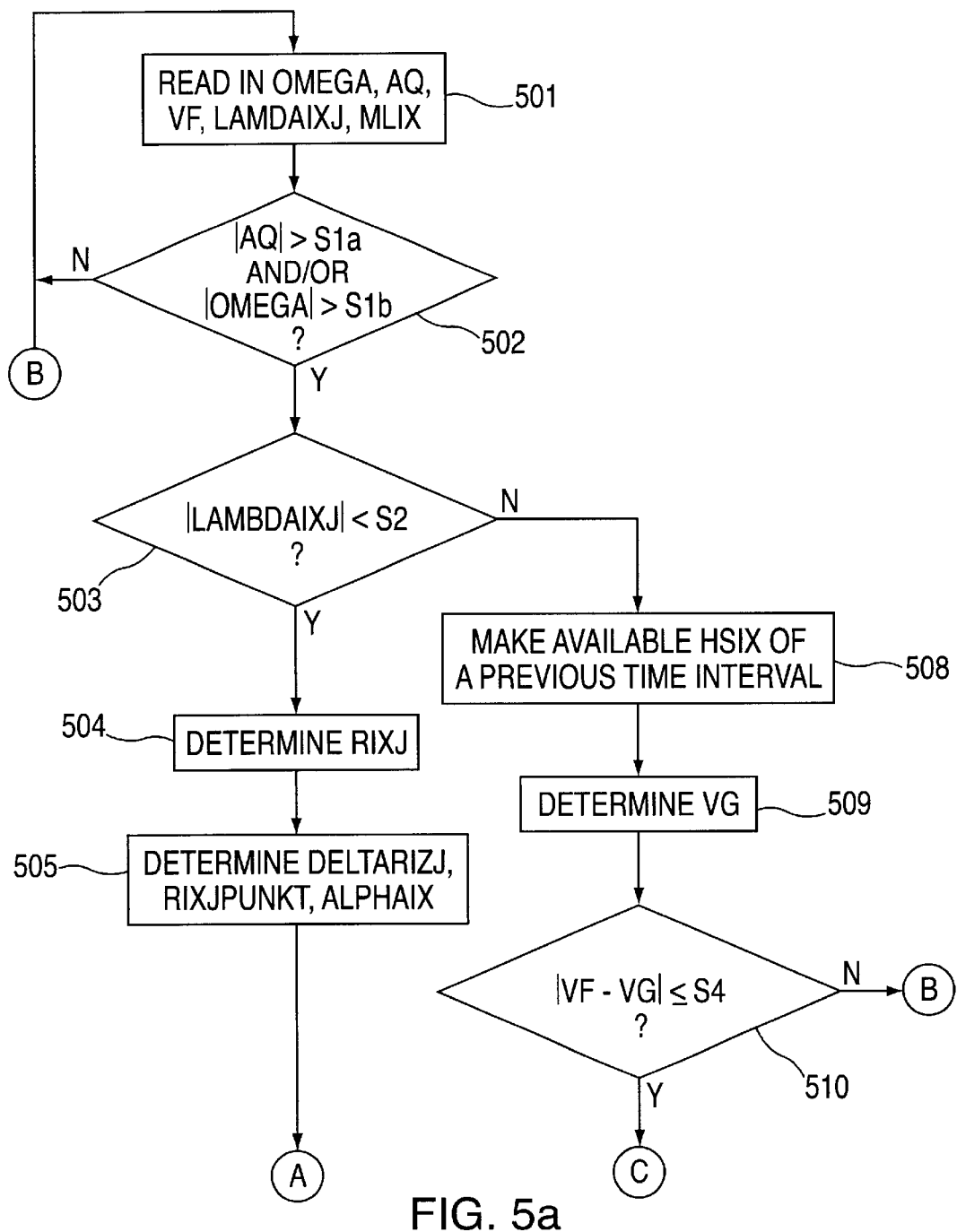
FIG. 5 shows a flow chart for carrying out a method according to the present invention.
Figure 5B:
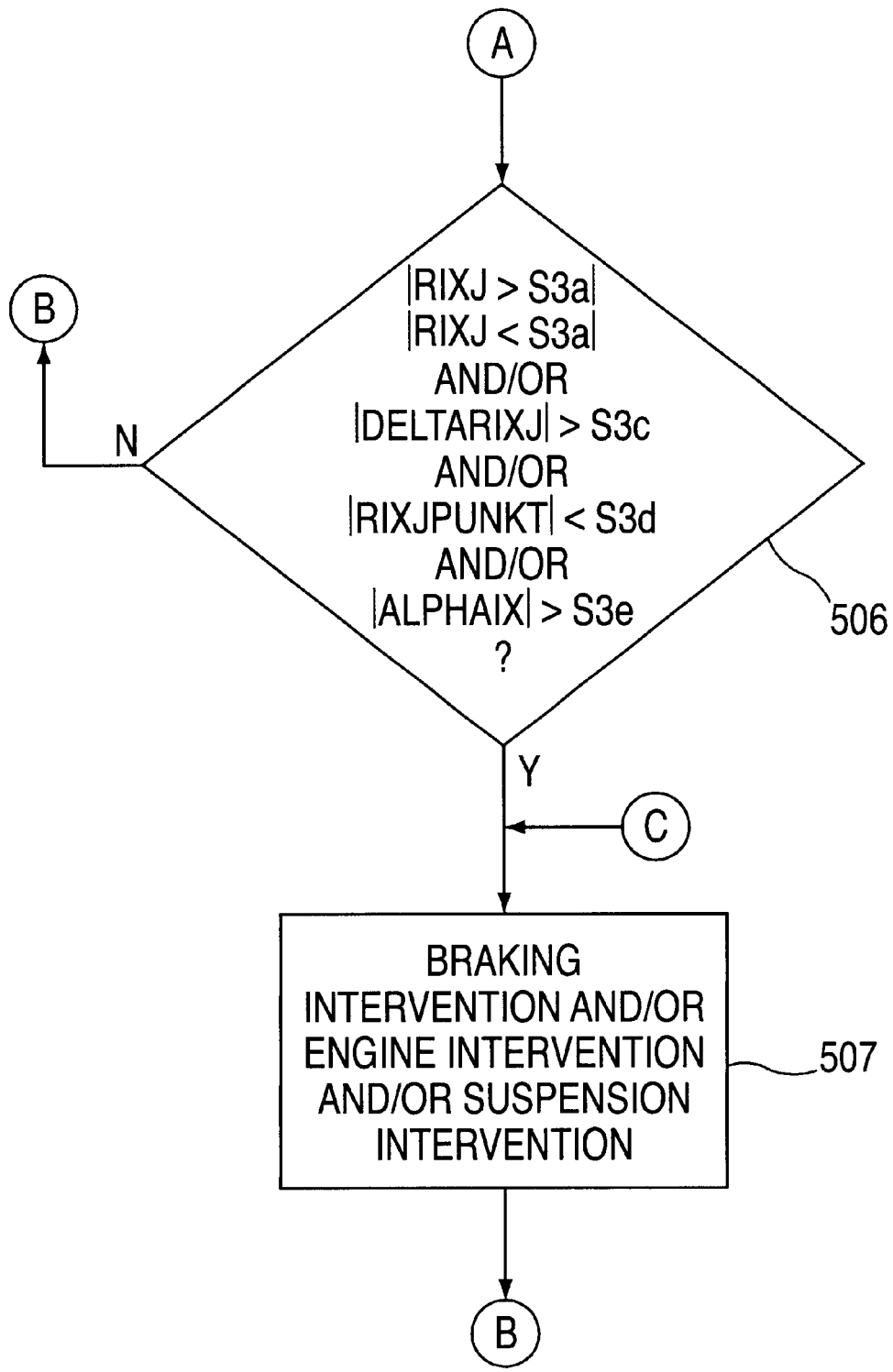

The second exemplary embodiment is described with the aid of FIGS. 4 and 5. The statements made in conjunction with FIG. 2 regarding the sensor suite and the controller also apply to the exemplary embodiment depicted in FIG. 4. Blocks and components that have already been described in conjunction with FIG. 2 will not be described further in conjunction with FIG. 4.

The secondary exemplary embodiment is also based on an integral vehicle as depicted in FIG. 1a. Wheel rotation speed sensors 201xj are used to determine variables nixj, which respectively describe the wheel rotation speed of the corresponding wheel 102ixj. Variables nixj are conveyed to blocks 401 and 404. Vehicle 101 contains a transverse acceleration sensor 202 and a yaw rate sensor 203. Variable aq describing the transverse acceleration of the vehicle is conveyed both to block 404 and to a block 402. Variable omega describing the yaw rate of the vehicle is conveyed to blocks 404, 401, and 402.

Variable vf determined in block 205 is conveyed to blocks 401 and 404. In addition, variables lambdaixj determined in block 205 are conveyed both to block 402 and to block 404.

In block 401, based on variable vf, variables nixj, and variable omega, variables rixj which quantitatively describe the wheel behavior of the wheels are determined. These variables rixj depend on the wheel load acting on the respective wheel. Variables rixj are, in particular, the dynamic roll radii of the wheels, which describe the diameter and, accordingly, the radius of the respective wheel, and are determined using the equation $$rixj = ([vf \pm a]) \cdot omega / nixj$$

in which variable a in the equation describes half the track width of the vehicle. A plus sign is used for the wheels on the outside of the curve, and a minus sign for the wheels on the inside of the curve. Variables rixj quantitatively describing the wheel behavior are conveyed from block 401 to block 402.

In block 402, on the basis of variables lambdaixj, rixj, aq, omega, and variables mlix alternatively conveyed to it, which respectively describe the axle-related load, a determination is made as to whether a tilt tendency of the vehicle about a vehicle axis oriented in the longitudinal direction of the vehicle exists. In block 402, in order to detect whether a tilt tendency exists for the vehicle, various queries are performed on the basis of the variables conveyed to it. These various queries are presented in FIG. 5 (yet to be described). If it is determined in block 402 that a tendency to tilt about a vehicle axis oriented in the longitudinal direction of the vehicle exists for the vehicle, then a variable KT is generated and conveyed to block 404. This variable KT informs the controller or vehicle controller 404 as to whether a tilt tendency of the vehicle exists. In FIG. 4, the two components 401 and 402 that are essential to the present invention and contained in the control unit are combined into one block 403.

The controller or vehicle controller implemented in control unit 104 is labeled 404. Controller 404 is assumed to correspond in terms of its basic function to controller 208 in FIG. 2. In addition to the control function implemented in block 404 as its basic function, a tipover prevention function is implemented in controller 404. This tipover prevention function can be, so to speak, at a higher level than the control system for the basic function. The tipover prevention function is performed substantially on the basis of variables KT.

For one type of tipover detection that is accomplished in block 402, the axle-related wheel loads mlix are required in block 402. These are determined in controller 404, for example in a conventional manner from the wheel rotation speeds, and are conveyed from block 404 to block 402.

Controller 404 generates variables ST1, which are conveyed to activation logic system 405 with which the actuators allocated to the vehicle are activated. Variables ST1 inform activation logic system 405 as to which actuators are to be activated and in what manner. In this context, variables ST1 are determined both for the basic control system function and the tipover prevention function. With regard to the generation of variables ST1 in accordance with the control system implemented for the basic function, reference is made to the aforementioned publication "FDR—die Fahrdynamikregelung von Bosch." (FDR—The Bosch Vehicle Dynamics Control System) Variables ST1 are correspondingly modified for the interventions that are performed for the tipover prevention function.

the inventions on the actuators of the vehicle performed in order to prevent the vehicle from tipping over correspond to those described in conjunction with FIG. 2.

In block 405 (the activation logic system), variables ST1 generated by controller 404 are converted into activation signals for engine 211 and activation signals for actuators 212ixj, 213ixj of the vehicle. This takes place in a manner corresponding to that described in conjunction with FIG. 2.

The suspension of the vehicle is influenced by suspension actuators 211ixj. To allow the controller to be aware of the current state of suspension actuators 211ixj, signals Frixj are conveyed from suspension actuators 211ixj to controller 208.

In addition to the actuators depicted in FIG. 2, the use of retarders is also possible. The braking system used in FIG. 2 can be a hydraulic, pneumatic, electrohydraulic or electropneumatic braking system.

Execution of the method according to the present invention of the second exemplary embodiment, as depicted in FIG. 4, will be described with the aid of the flow chart depicted in FIG. 5. The method according to the present invention is executed substantially in block 403.

The method according to the present invention begins with a step 501 in which variables nixj, omega, aqa, vf, lambdaixj, and mlix are read in. Subsequent to step 301, a step 502 is performed. The query taking place in step 502 corresponds to the one taking place in step 302. If at least one of the two subquery conditions in step 502 is met, then a step 503 is performed subsequent to step 502. If, however, neither of the two subquery conditions in step 502 is met, then step 501 is performed again subsequent to step 502.

In step 503, the magnitude of variable lambdaixj describing the drive slip and/or brake slip is compared to a threshold value S2. The query taking place in step 503 is performed for the following reason: the determination taking place in step 504 of variables rixj quantitatively describing the wheel behavior, which represent the dynamic roll radii of the wheels, can be performed only if the wheels are more or less slip-free, i.e. if the drive slip and/or brake slip of the wheels is less than a predefined threshold value. If this condition is not met, variables rixj quantitatively describing the wheel behavior cannot be determined correctly.

If it is determined in step 503 that the magnitude of variable lambdaixj is less than the corresponding threshold value, then subsequent to step 503, step 504 is performed, initiating a first set of queries to detect a tilt tendency. The first set of queries comprises steps 503 through 506. If, however, it is found in step 503 that the magnitude of variable lambdaixj is greater than the corresponding threshold value S2, then subsequent to step 503 a step 508 is performed, initiating a second set of queries to detect a tilt tendency. The second set of queries comprises steps 508 through 510.

The indexed depiction used in the individual steps, "lamdaixj" for example, is intended to indicate that the individual steps are to be performed for any desired individual wheel or for any desired number of wheels or for all the wheels of the vehicle.

In step 504, the variables quantitatively describing the wheel behavior are determined using the aforementioned equation. As already indicated above, these variables can be determined only if not too much wheel slip exists, i.e. if the wheel rotation speeds and vehicle speed do not differ very much from one another. If this is not the case, erroneous decisions can result in step 506 on the basis of variables rixj determined in this vehicle state. Subsequent to step 504, a step 505 is performed. In step 505, variables deltarixj, rixjpunkt, and alphaix are determined. Variable deltarixj is a difference between the current value of variable rixj quantitatively describing the wheel behavior, and a value of the variable quantitatively describing the wheel behavior that was determined while traveling straight ahead.

The value that corresponds to the variable quantitatively describing the wheel behavior while traveling straight ahead is determined from time to time in suitable driving situations, and is temporarily stored in a corresponding memory.

Variable rixjpunkt is a variable that represents the change over time in variable rixj quantitatively describing the wheel behavior. Variable rixjpunkt corresponds in particular to the derivative over time of variable rixj. Variable alphaix is a variable describing the angle of inclination of a wheel axle. Variable alphaix is determined in accordance with the equation $$\text{alphaix}=(rixl-rixr)/(2\cdot a)$$

As this equation indicates, a variable describing the inclination of the wheel axle is determined on the basis of the variables determined for the two wheels of the wheel axle which respectively quantitatively describe the wheel behavior.

Also incorporated into variable alphaix is the track $2a$ of the vehicle. The above equation for the angle of inclination alphaix represents an approximation that is valid for small values of the angle alphaix.

Subsequent to step 505, a step 506 is performed. Step 506 detects whether a tendency to tilt about a vehicle axis oriented in the longitudinal direction of the vehicle exists for the vehicle. The individual queries performed in step 506 are performed using the variables determined in step 505, which in turn are determined as a function of the current value, determined in step 504, of variable rixj quantitatively describing the wheel behavior.

In a first subquery, a determination is made as to whether the current value of the variable rixj is greater than a first threshold value S3$a$. First threshold value S3$a$ is assumed, in this context, to represent the radius of the unloaded wheel. This query ascertains whether, while the vehicle is driving through a curve, the wheels on the inside of the curve are threatening to lift off. The first subquery contains a further query which ascertains whether the current value of variable rixj is less than a second threshold value S3b. This query detects wheels that are located on the outside of the curve, and that are being greatly compressed because of a tilt tendency of the vehicle. The result of the first subquery is thus to compare the absolute value of the dynamic roll radius for detection of the tilt tendency of the vehicle to corresponding threshold values. A tilt tendency of the vehicle exists either if the dynamic roll radius of a wheel on the inside of the curve is greater than threshold value S3a, or if the dynamic roll radius of a wheel on the outside of the curve is less than threshold value S3b.

A second subquery ascertains whether the magnitude of the difference deltarixj is greater than a third threshold value S3c. This subquery evaluates the relative change in the dynamic roll radius that results when negotiating a curve from a straight-ahead driving state, in order to detect whether a tilt tendency of the vehicle exists. A tilt tendency of the vehicle exists if the magnitude of the difference is greater than the corresponding threshold S3c.

A third subquery ascertains whether the magnitude of variable rixjpunkt, which describes the change over time in variable rixj quantitatively describing the wheel behavior, is less than a fourth threshold value S3d. A tilt tendency of the vehicle exists if the magnitude of the variable describing the change over time is less than the fourth threshold value S3d.

A fourth subquery ascertains whether the magnitude of variable alphaix describing the angle of inclination of a wheel axle is greater than a fifth threshold value S3e. A tilt tendency of the vehicle exists if the magnitude of variable alphaix is greater than threshold S3e.

With the aid of the subqueries executed in step 506, a tilt tendency of a vehicle is detected if at least one of the four subquery conditions is met. If at least one of the subquery conditions is met, then a step 507 is performed subsequent to step 506. The output of variable KT which takes place in the presence of a tilt tendency in block 402 is not depicted in FIG. 5. If none of the subquery conditions is met in step 506, i.e. if no tilt tendency of the vehicle exists, then step 501 is performed again subsequent to step 506.

In step 507, as mentioned in conjunction with FIGS. 4 and 2, corresponding brake interventions and/or engine interventions and/or suspension interventions are performed in order to prevent the vehicle from tilting about a vehicle axis oriented in the longitudinal direction of the vehicle.

If it is found in step 503 that the magnitude of variable lambdaixj is greater than the corresponding threshold value S2, then the first type of detection cannot be used. A step 508, with which a second type of detection is initiated, is therefore performed subsequent to step 503. This second type of detection is performed as a function of the variable, determined for at least one wheel in a previous time interval, that quantitatively describes the wheel behavior. In step 508, a variable hsix describing the center-of-gravity height of the vehicle, which in particular represents an axle-related center-of-gravity height, is made available. This is done, for example, by reading in variable hsix which was determined for a previous time interval in the query condition applied in step 503 was met and was temporarily stored. Alternatively, variable hsix can be determined as a function of variables rixj, which were determined for a previous time interval in which the query condition applied in step 503 was met and were temporarily stored. The axle-related center-of-gravity height hsix is generally determined using the equation $$hsix=[(C \cdot a^2)/(mlix \cdot aq)] \cdot alphaix$$

In the above equation, variable C represents the resulting vertical stiffness of the wheels allocated to the wheel axle, variable a corresponds to half the track width of the wheel axle, variable alphaix corresponds to the angle of inclination of the wheel axle with respect to the road surface, variable mlix corresponds to the load acting on the wheel axle, and variable aq corresponds to the transverse acceleration acting on the vehicle. The variables mlix, aq, and alphaix used are, for example, those of the time interval in which the query condition applied in step 503 was still met. In this case, this means that variable mlix, variable aq, and variable alphaix, or variables rixj necessary for determining variable alphaix, must continuously be stored in a temporary memory. Subsequent to step 508, a step 509 is performed.

In step 509, in a conventional manner, a speed limit value for the vehicle traveling through the curve is determined on the basis of variable hsix describing the center-of-gravity height of the vehicle. The speed limit value indicates the speed for the vehicle at which tilting of the vehicle about a vehicle axis oriented in the longitudinal direction of the vehicle is not to be expected. For the determination of the speed limit value as a function of the variable describing the center-of-gravity height of the vehicle, reference is made, for example, to the formula found in the "Kraftfahrtechnische Taschenbuch," (Automotive Engineering, Handbook) VDI-Verlag, 21st edition, page 346. Subsequent to step 509, a step 510 is performed. In step 510, a determination is made as to whether the magnitude of the difference between the vehicle speed and the speed limit value is less than or equal to a threshold value S4. If the magnitude of the difference is less than or equal to the threshold value S4, then a tilt tendency of the vehicle about a vehicle axis oriented in the longitudinal direction of the vehicle exists, and step 507 is performed subsequent to step 510. If, however, the magnitude of the difference is greater than the threshold value S4, which is the same as a tilt tendency of the vehicle not existing, then step 501 is performed subsequent to step 510.

The flow chart depicted in FIG. 5 is also correspondingly applicable to a vehicle combination.

Figure 6:
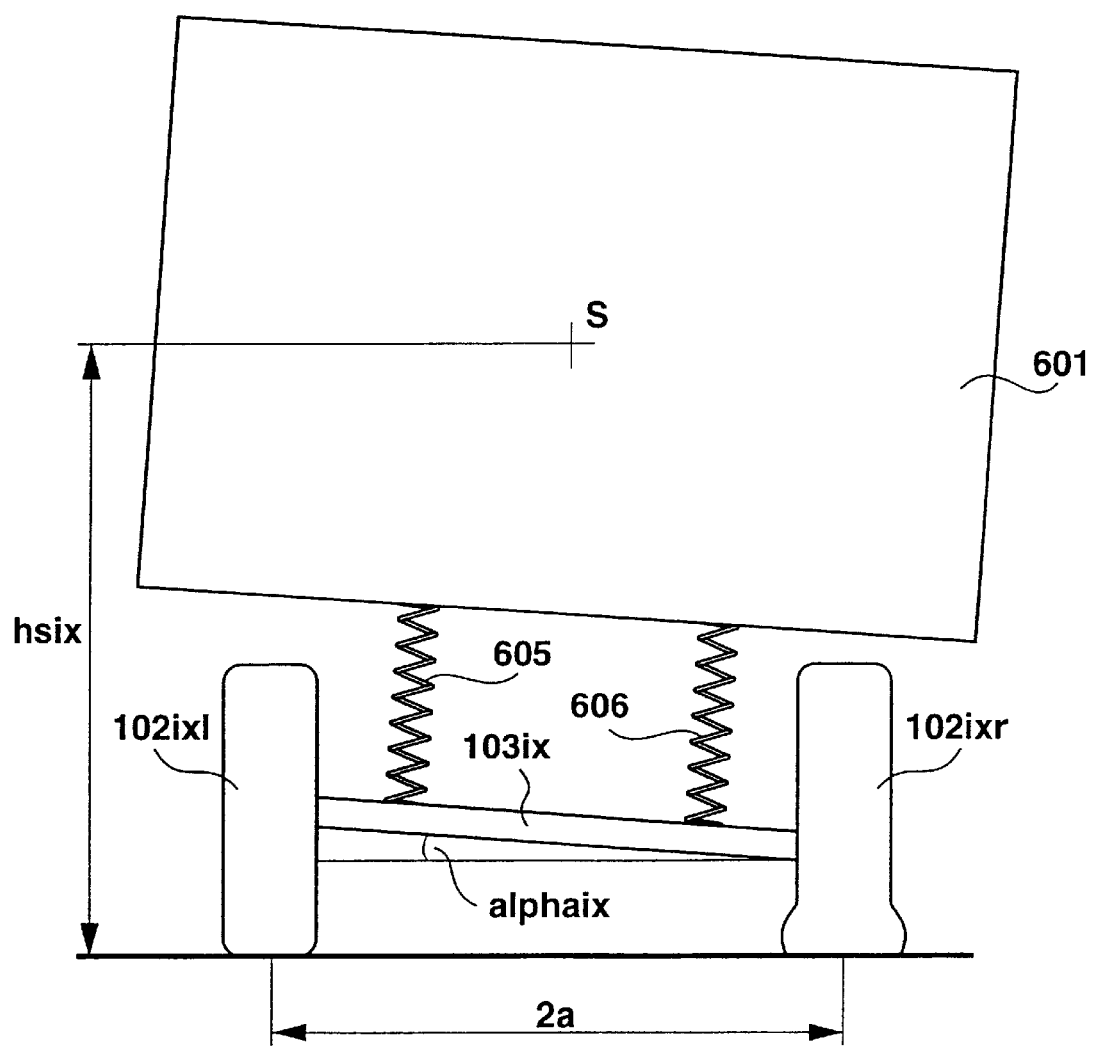
FIG. 6 shows a schematic of physical state of affairs for a road vehicle passing through a curve.

In conclusion, FIG. 6 shows the physical state of affairs underlying the method according to the present invention. FIG. 6 schematically depicts an integral vehicle such as the one depicted in FIG. 1a. This is not, however, intended to represent any limitation.

FIG. 6 depicts a wheel axle 103ix having the associated wheels 102ixl and 102ixr. Also depicted is the vehicle body 601, joined to wheel axle 103ix by way of suspension devices 605 and 606. Track width 2a of the vehicle is indicated in FIG. 6. Also indicated are the axle-related center of gravity S and the associated axle-related center-of-gravity height hsix. Also indicated is the angle of inclination alphaix of the wheel axis with respect to the road surface. The vehicle is traveling forward through a curve to the left.

As FIG. 6 shows, load displacements occur when traveling through a curve: wheel 102ixl on the inside of the curve is unloaded, and in extreme situations can lose contact with the road. It is immaterial in this context whether the curve is negotiated on a flat or an inclined road surface. Wheel 102ixr on the outside of the curve experiences a greater load. As a result of these load displacements at the individual wheels, the respective dynamic roll radius rixj changes. At the wheels on the inside of the curve the normal force transferred by the wheel approaches zero, so that only small or even no peripheral forces can then be transferred through the tires onto the road surface. In such a situation, the slip conditions at the corresponding wheel are particularly sensitive to changes in wheel dynamics, which can be caused, for example, by the brief generation and/or modification of drive torques and/or braking torques at the respective wheel.

Both can be used to detect a wheel that is lifting off, which in turn can be used to detect the tilt tendency of the vehicle about a vehicle axis oriented in the longitudinal direction of the vehicle.

What is claimed is:

1. An apparatus for stabilizing a vehicle in the presence of a tilt tendency to prevent a tipover of the vehicle, comprising:
   a first device determining, for at least one wheel, a variable describing a change in a slip of the at least one wheel and determining whether a tilt tendency about a vehicle axis oriented in the longitudinal direction of the vehicle exists as a function of the variable describing the change in the slip of the at least one wheel;
   a second device determining a variable describing a diameter or a radius of the at least one wheel;
   a third device determining whether the tilt tendency exists as a function of the variable describing the one of the diameter or the radius of the at least one wheel; and
   an arrangement stabilizing braking interventions on at least one wheel of the vehicle in the presence of the tilt tendency.

2. A method for stabilizing a vehicle in the presence of a tilt tendency to prevent a tipover of the vehicle, comprising:
   stabilizing braking interventions on at least one wheel of the vehicle;
   for at least one wheel, determining at least one of: i) a variable describing a change in a slip of the at least one wheel, and ii) a variable describing a diameter or a radius of the at least one wheel; and
   determining whether a tilt tendency about a vehicle axis oriented in a longitudinal direction of the vehicle exists as a function of one of: i) the variable describing the change in the slip of the at least one wheel, and ii) the variable describing the diameter or the radius of the at least one wheel.

3. The method according to claim 1, further comprising:
   determining the variable describing the diameter or the radius of the at least one wheel as a function of a variable describing a wheel rotation speed of the at least one wheel, a variable describing a vehicle speed, a variable representing transverse dynamics of the vehicle, and a variable describing a geometry of the vehicle.

4. The method according to claim 2, further comprising:
   determining a variable describing at least one of a yaw rate of the vehicle and a transverse acceleration of the vehicle, the variable describing at least one of the yaw rate the vehicle and the transverse acceleration of the vehicle being the variable representing the transverse dynamics of the vehicle; and
   determining the variable describing the vehicle speed as a function of the variable describing the wheel rotation speed of the at least one wheel.

5. The method according to claim 1, further comprising:
   determining at least one variable representing transverse dynamics of the vehicle;
   at least one of briefly generating and modifying one of braking torques and drive torques as a function of one of the at least one variable representing the transverse dynamics of the vehicle; and
   one of during and after the time period in which at least one of the braking torques and the drive torques are being at least one of briefly generated and modified at the at least one wheel, determining the variable describing the change in the slip of the at least one wheel.

6. The method according to claim 5, wherein:
   the tilt tendency of the vehicle exists if a magnitude of the variable describing the change in the slip of the at least one wheel is greater than a corresponding threshold.

7. The method according to claim 5, further comprising;
   determining which wheels of the vehicle are suitable for detecting the tilt tendency as a function of a variable representing transverse dynamics of the vehicle; and
   detecting the tilt tendency as a function of at least one of briefly generating and modifying at least one of the braking torques and the drive torques.

8. The method according to claim 7, further comprising the step of:
   selecting the wheels of the vehicle located on an inside of a curve as the wheels of the vehicle suitable for detecting the tilt tendency.

9. The method according to claim 1, wherein:
   the tilt tendency exists if, for at least one wheel, at least one of:
   a value of the variable describing the diameter or the radius is one of greater that a first threshold and less than a second threshold value;
   a first magnitude of a difference between the variable describing the diameter or the radius and a comparison value is greater than a third threshold value;
   a second magnitude of a variable describing a change over time in the variable describing one of the diameter and the radius is less than a fourth threshold value; and
   a third magnitude of a variable describing an angle of inclination of a wheel axle greater than a fifth corresponding value.

10. The method according to claim 9, further comprising the step of:
    determining the variable describing the diameter or the radius for each wheel of a wheel axle;
    determining the angle of inclination of each wheel axle as a function of the variable describing the diameter or the radius for each wheel of the wheel axle.

11. The method according to claim 1, wherein:
    the tilt tendency exists if a magnitude of a difference between a speed limit value and the variable describing the vehicle speed is less than a sixth threshold value.

12. The method according to claim 1, further comprising:
    performing stabilizing interventions on at least a front wheel of the vehicle on an outside curve so that a braking torque is at least one of generated and increased for the front wheel.

13. The method according to claim 1, further comprising:
    performing at least one of engine interventions and interventions on suspension actuators to stabilize the vehicle.

14. A method for stabilizing vehicle in a presence of a tilt tendency to prevent a tipover of the vehicle, comprising:
    determining whether a tilt tendency about a vehicle axis oriented in a longitudinal direction of the vehicle exists; and
    if the tilt tendency exists, performing stabilizing braking intervention in a controlled fashion on a front wheel of the vehicle, the front wheel being on an outside curve.

* * * * *

UNITED STATES PATENT AND TRADEMARK OFFICE
CERTIFICATE OF CORRECTION

PATENT NO. : 6,756,890 B1
DATED : June 29, 2004
INVENTOR(S) : Herbert Schramm et al.

It is certified that error appears in the above-identified patent and that said Letters Patent is hereby corrected as shown below:

Column 1,
Line 15, change "German Patent 32 22 149" to -- German Patent No. 32 22 149 --

Column 2,
Line 26, change "preformed" to -- performed --

Column 9,
Line 62, change "are, for example, a decrease" to -- are, for example, possible: A decrease --

Column 11,
Line 51, change "in a conventional processor." to -- in a conventional manner. --

Column 13,
Line 21, change "Dynamics Control System)" to -- Dynamics Control System). --

Column 15,
Line 57, change "in the query condition" to -- in which the query condition --

Column 16,
Line 23, change "...Engineering, Handbook)" to -- ...Engineering, Handbook), --

Signed and Sealed this

Twenty-second Day of March, 2005

JON W. DUDAS
*Director of the United States Patent and Trademark Office*